United States Patent
Ljungar et al.

(10) Patent No.: US 6,821,636 B2
(45) Date of Patent: Nov. 23, 2004

(54) METHOD OF PRODUCING FORMALDEHYDE LADEN LAYERED PRODUCTS HAVING REDUCED EMISSION OF FORMALDEHYDE

(75) Inventors: Robin Ljungar, Täby (SE); Ingvar Lindh, Bromma (SE); Salme Pirhonen, Sollentuna (SE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 10/093,479

(22) Filed: Mar. 11, 2002

(65) Prior Publication Data

US 2002/0168470 A1 Nov. 14, 2002

Related U.S. Application Data

(60) Provisional application No. 60/274,607, filed on Mar. 12, 2001.

(51) Int. Cl.$^7$ .................................................. B32B 27/42
(52) U.S. Cl. .................. 428/524; 428/528; 428/529; 428/536; 428/537.1; 427/341; 427/342; 427/382; 427/401; 156/331.3
(58) Field of Search ................................ 428/524, 528, 428/529, 536, 537.1; 427/341, 342, 382, 401; 156/331.9

(56) References Cited

U.S. PATENT DOCUMENTS

| | | | |
|---|---|---|---|
| 4,264,760 A | | 4/1981 | Meyer ......................... 528/230 |
| 4,376,807 A | * | 3/1983 | Cannon |
| 4,409,375 A | | 10/1983 | Hartman ...................... 525/505 |
| 4,478,966 A | | 10/1984 | Helgesson .................... 524/13 |
| 5,578,371 A | | 11/1996 | Taylor ......................... 428/288 |

FOREIGN PATENT DOCUMENTS

| | | |
|---|---|---|
| EP | 0006486 B1 | 1/1980 |
| EP | 0006486 | 1/1980 |
| EP | 0012169 B1 | 6/1980 |
| EP | 0012169 A1 | 6/1980 |
| EP | 0144985 A2 | 6/1985 |
| EP | 0144985 B1 | 6/1985 |
| EP | 0144 985 * | 6/1985 |
| GB | 2274084 A | 7/1994 |
| JP | 114 628 * | 5/1987 |

OTHER PUBLICATIONS

Derwent Abstract of EP144985.
Derwent Abstract XP–002171075 of JP48 072308.
English translation of Japanese Laid Open No. 1973–72308.
Derwent Abstract XP–002171076 of JP62114629.
English translation of Japanese Laid Open No. 1987–114629.
Derwent Abstract XP–002171077 of JP 11223023.
Derwent Abstract of DE 2851589.
Derwent Abstract of DE 2829021.

\* cited by examiner

*Primary Examiner*—Ieszek B Kiliman
(74) *Attorney, Agent, or Firm*—David J. Serbin

(57) ABSTRACT

A method of producing formaldehyde laden layered products, the products having reduced emission of formaldehyde, of at least 2 layers, at least one of the layers being a veneer, comprising a step of treating at least one of the surfaces of said veneer, prior to bonding the layers together, with a solution comprising an ammonium salt. The invention also relates to a flooring material obtained by the method.

25 Claims, No Drawings

METHOD OF PRODUCING FORMALDEHYDE LADEN LAYERED PRODUCTS HAVING REDUCED EMISSION OF FORMALDEHYDE

This application claims the benefit of Provisional application No. 60/274,607, filed Mar. 12, 2001.

The present invention relates to a method of producing formaldehyde laden layered products of at least two layers, having reduced emission of formaldehyde, at least one of the layers being a veneer. It also relates to a veneer and a flooring material obtained by the method. The method according to the present invention comprises treatment, prior to bonding the layers together, of at least one of the surfaces of said veneer with a solution comprising an ammonium salt.

Aldehydes, especially formaldehyde based resins, are widely used in adhesive compositions, which are used in the manufacture of construction materials such as panelling, decking, etc.; home furnishings such as furniture, flooring material, etc. Typically, these adhesives compositions contain a substantial molar excess of formaldehyde. Some of this excess formaldehyde is released upon curing of the resin during the manufacture of the product. However, it is well known that formaldehyde continues to be released from these products even after the manufacturing process is completed. Thus, formaldehyde in the indoor air has been a major concern for many years.

Several attempts have been made for many years for reducing formaldehyde emission, but all entail significant mechanical, chemical, environmental or economical disadvantages.

EP 0 144 985 discloses a method of reducing the emission of formaldehyde from chipboards and fibreboards, which fall into emission class E1, veneered with finishing layers. The finishing layer is bonded to the board by using a urea formaldehyde resin as a binder. The boards are treated prior to veneering with an aqueous solution of urea and/or other compounds giving off ammonia.

Moreover, layered flooring material, such as three-layer parquet floor can emit formaldehyde due to the different wood layers being normally bonded together by gluing with formaldehyde based adhesives. The top layer usually consists of hardwood, the middle layer of softwood or a board, for example, MDF (Medium Density Fibre)-board, HDF (High Density Fibre)-board or particle board and the bottom layer of a veneer. The top layer is usually treated with a formaldehyde free UV-lacquer or an oil to protect the surface, which also functions as a barrier to the formaldehyde emission. The different parts of a parquet sample, such as the front, the back, and the edges, give different emission rates. For example, the formaldehyde emission from the backside can be 20 times higher than that from the front side.

Furthermore, there is an increasing demand for parquet flooring which can meet the required E1 value obtained in a chamber test according to the Swedish standard SS 270236 (SS 1988). In cases where the emission test for parquet flooring has been performed with samples having unexposed backsides and sealed edges, the obtained emission values have been very low, often under 0.05 mg/m$^3$ (the limit value for E1 being 0.13 mg/m$^3$).

Additionally, there is proposed a new European standard, EN 717-1, for formaldehyde emission determination, according to which all samples to be measured will have exposed backside and partially exposed edges. This makes it more difficult for the flooring producers to achieve extremely low formaldehyde emission values.

Furthermore, there will be demands on meeting the Japanese standard JAS SIS20, which involves a desiccator measurement where the backside and the edges of the sample cannot be sealed, but they are totally exposed.

Thus, technical solutions are still sought for the need to decrease the emission of formaldehyde from wood-based products containing formaldehyde-based resins, meeting the new more strict standards for formaldehyde emission from these products.

Accordingly, the present invention provides a method of producing wood-based products containing formaldehyde based resins having reduced emission of formaldehyde, by which the above mentioned problems are overcome. The method, according to the present invention, also provides for an easier handling and reduces the risk of discoloration of the finished layered product due to the salt used, comparing to methods where treatment with the salt solution takes place subsequent to bonding of the layers together.

The method, according to the invention, comprises treatment of at least one of the surfaces of a veneer, comprised in a formaldehyde laden layered product having at least two layers, prior to bonding the layers together, with a solution comprising an ammonium salt.

By "formaldehyde laden layered products" is herein meant layered products containing formaldehyde-based resins, wherein the layers are bonded to each other by a formaldehyde-based adhesive. Furthermore, in case one or more of the layers in the layered product is a board, e.g., as a middle layer in a flooring material, the board as such may also be bonded with a formaldehyde-based adhesive.

Suitably, the concentration of the ammonium salt in the solution is from about 1 to about 60 weight %, preferably from about 5 to about 40 weight %, and most preferably from about 8 to about 30 weight %. Moreover, the concentration of the salt in the solution depends on which salt is used, since the water-solubility of different salts may vary and thus different amounts of salt are needed in order to obtain an solution that is effective to formaldehyde emission. Thus, when the ammonium salt used is an ammonium sulphite, the concentration of it in the solution is suitably from about 1 to about 30 weight %, preferably from about 5 to about 20 weight %, and most preferably from about 8 to about 13 weight %. When the ammonium salt used is an ammonium carbonate, the concentration of it in the solution is suitably from about 5 to about 60 weight %, preferably from about 15 to about 40 weight %, and most preferably from about 20 to about 30 weight %.

Although application of the salt in the form of a solution is preferred, according to the invention, it may also be applied in the form of a powder, if so desired. For environmental reasons, the solution is suitably an aqueous solution, although other solvents than water may be used. The salt solution may be applied by using any conventional coating technique, such as roller coating, curtain coating, or, spray coating. The amount of salt solution applied, when only one of the surfaces is treated, is suitably from about 30 to about 90 g/m$^2$, preferably from about 40 to about 80 g/m$^2$, and most preferably from about 55 to about 65 g/m². If both of the surfaces are to be treated, then the applied amount per side is suitably half of the amount if only one of the surfaces would be treated. In order to avoid disturbance of the moisture balance of the treated product large amounts of salt solution are undesirable.

Suitable ammonium salts, according to the invention, include, for example, ammonium sulphite or bisulphite, ammonium carbonate, or, ammonium hydrogen carbonate. Preferably, ammonium sulphite or ammonium carbonate is used.

The method of reducing the amount of formaldehyde liberated by materials and products prepared with formaldehyde based resins is applicable to all formaldehyde based resins, for example, it is applicable to urea-formaldehyde, melamine-formaldehyde, phenol-formaldehyde resins and the like as well as copolymers, blends and mixtures made therefrom.

In a preferred embodiment of the invention, urea is added to the ammonium salt solution. Even though the ammonium salt does alone effectively reduce the emission of formaldehyde, addition of urea in the salt solution improves further the reduction of formaldehyde emission. Suitably, the weight ratio of urea to ammonium salt is from about 1:10 to about 1:1, preferably from about 2:10 to about 8:10, and most preferably from about 3:10 to about 6:10.

The salt solution for use in the method according to the invention is prepared by a process, which comprises mixing of the ammonium salt, the urea and the water in a mixing ratio, which gives the desired concentration of salt and urea in the solution.

In a preferred embodiment of the process according to the present invention, the ammonium salt is in the form of an aqueous solution before mixing with the urea and required additional water for receiving a solution with the desired salt concentration.

In a further preferred embodiment of the process according to the invention, both the ammonium salt and the urea are in the form of aqueous solutions before mixing with each other for preparing an aqueous solution according to the invention with the desired salt concentration.

The veneer to be treated according to the invention may be any kind of wood veneer, preferably untreated veneer.

The veneers may be conditioned after the application of the salt solution to desired moisture content before the bonding stage.

The layers can be bonded by using any of the known conventional techniques, for example, by gluing and pressing.

Preferably, the veneer treated by the method according to the invention constitutes the backside surface or layer of the layered product. This gives rise to a significant reduction of the emission of formaldehyde from the backside of the layered product.

Furthermore, although only one of the surfaces of the veneer need be coated with the salt solution to achieve the benefits of the invention, depending on the application method both of the surfaces may be coated if so desired.

The layered product, according to the invention, may be any wood-based layered product. Suitably, it is a flooring material, preferably a parquet flooring, and most preferably a three-layer parquet flooring.

The invention is further illustrated by means of the following non-limiting examples. Parts and percentages relate to parts by weight respectively percent by weight, unless otherwise stated.

EXAMPLES

The ammonium sulphite solution used in examples 1–8 was prepared by mixing 19.7 kg of ammonium sulphite solution (35–36 weight %) and 3.0 kg urea with water to obtain a 10 weight % aqueous salt solution.

The ammonium carbonate solution used in examples 1–8 was prepared by mixing 31.6 kg urea, 40.0 kg ammonium bicarbonate and 28.4 kg ammonium carbonate with water to obtain a 27.8 weight % aqueous salt solution.

Example 1 (reference)

Veneers of spruce (2 mm thick) were glued on both sides of the core material of pine with a urea-formaldehyde resin and a hardener.

Example 2

Veneers of spruce (2 mm thick) were pre-treated with an ammonium carbonate solution, on both sides and then left to dry for 4 hours before gluing and pressing in the same way as in example 1.

Example 3 (comparison)

The procedure in example 1 was repeated, except that, after gluing and pressing, the sample was left 15 minutes at ambient temperature and then the backside (the side facing away from the glue line) of the veneers was sprayed with an ammonium carbonate solution.

Example 4

Veneers of spruce (2 mm thick) were pre-treated with an ammonium sulphite solution, on both sides, left to dry and then glued and pressed in the same way as in example 2.

Example 5 (comparison)

The procedure in example 3 was repeated, except that the backside of the veneers was sprayed with an ammonium sulphite solution.

The formaldehyde emission from all samples prepared according to the above examples was measured with a Field and Laboratory Emission Cell (FLEC) after 24 hours conditioning. The results are shown in table 1 below.

TABLE 1

| Example | Treatment of the veneers | Concentration of the salt solution, % by weight | Applied amount salt solution, g/m² per treated side | Emission μg/m²h after 24 hours |
|---|---|---|---|---|
| 1 | Without treatment | | | 733 |
| 2 | Pre-treated with an ammonium carbonate solution | 27.8 | 31 | 44 |
| 3 | Post-treated with an ammonium carbonate solution | 27.8 | 63 | 105 |
| 4 | Pre-treated with an ammonium sulphite solution | 10 | 29 | <10 |
| 5 | Post-treated with an ammonium sulphite solution | 10 | 58 | 45 |

As can be seen from table 1, the formaldehyde emission was lower when the veneers where pre-treated than when they were post-treated.

In the following examples 6–8, a 3-layer parquet flooring, 365 mm in length and 260 mm in breadth, was manufactured by bonding the layers together with a urea-formaldehyde resin and a hardener.

Example 6 (reference)

A parquet flooring was manufactured using an untreated veneer as a backside layer.

Example 7

A parquet flooring was manufactured using as a backside layer a veneer treated on one side, the side that constitutes the backside surface of the parquet flooring, with an ammonium carbonate solution, before bonding.

Example 8

A parquet flooring was manufactured as in example 1, except that after gluing and pressing the layers together the backside surface of the parquet flooring was treated with an ammonium carbonate solution.

Samples with a size of 250 mm×250 mm were sawn from the parquet floorings manufactured as above and the formaldehyde emission from the backside was measured with a Field and Laboratory Emission Cell (FLEC) after 24 hours conditioning. The results are shown in table 2 below.

nates the risk of discolouring the outer layer of the layered product, but it also results in a lower formaldehyde emission.

In the following examples 9–11, an aqueous ammonium sulphite solution of 10 weight % was used, without any urea added.

Example 9 (reference)

A laminated structure was manufactured by gluing veneers of beech (0.6 mm thick) on both sides of a core material of plywood with a urea-formaldehyde resin and a hardener.

Example 10

A laminated structure was manufactured in the same way as in example 9 except that the surfaces on both sides of the core material was pre-treated with an ammonium sulphite solution, and then left to dry for 4 hours before gluing the veneers onto it.

Example 11

A laminated structure was manufactured in the same way as in example 9 except that the veneers were pre-treated on one side with an ammonium sulphite solution, and then left to dry for 4 hours before gluing.

Two samples with a size of 25 mm×25 mm were sawn from each of the laminated structures of examples 9–11 and the formaldehyde emission was determined by a modified

TABLE 2

| Example | Treatment of the veneers | Concentration of the salt solution, % by weight | Applied amount salt solution, g/m² per treated side | Emission μg/m²h after 24 hours |
|---|---|---|---|---|
| 6 | Without treatment | | | 233 |
| 7 | Pre-treated with an ammonium carbonate solution | 27.8 | 74 | 30 |
| 8 | Post-treated with an ammonium carbonate solution | 27.8 | 74 | 36 |

Evidently, pre-treatment not only provides for an easier handling during application of the salt solution and elimi- "Flask method" (EN 717-3). Each pair of samples was suspended in 50 ml water at 40° C. for 3 hours. The formaldehyde content in the water was determined photometrically by using acetyl acetone and ammonium acetate which react with formaldehyde. The result is expressed as mg formaldehyde per liter and is shown in table 3 below.

TABLE 3

| Example | Treatment of veneers or core material | Concentration of salt solution, % by weight | Applied amount salt solution, g/m² per treated side | Formaldehyde content in water, mg/l |
|---|---|---|---|---|
| 9 | Without treatment | | | 2.9 |
| 10 | Pre-treatment of core material with an ammonium suiphite solution | 10 | 80 | 1.2 |
| 11 | Pre-treatment of veneers with an ammonium sulphite solution | 10 | 80 | <0.5 |

As can be seen from table 3, the formaldehyde content was significantly lower when the veneers where pre-treated than when the core material was pre-treated.

What is claimed is:

1. A method of producing formaldehyde laden layered products, the products having reduced emission of formaldehyde, of at least 2 layers, at least one of the layers being a veneer, comprising a step of treating at least one of the surfaces of said veneer, prior to bonding the layers together, with a solution comprising an ammonium salt.

2. A method according to claim 1, wherein said solution is an aqueous solution.

3. A method according to claim 1, wherein said solution has an ammonium salt content in the range from about 5% to about 30% by weight.

4. A method according to claim 2, wherein said solution has an ammonium salt content in the range from about 5% to about 30% by weight.

5. A method according to claim 1, wherein the ammonium salt is ammonium sulphite or bisulphite.

6. A method according to claim 1, wherein the ammonium salt is ammonium carbonate or ammonium hydrogen carbonate.

7. A method according to claim 1, wherein the solution further comprises urea.

8. A method according to claim 7, wherein the weight ratio of urea to ammonium salt is from about 3:10 to about 6:10.

9. A method according to claim 1, wherein the veneer treated by the method according to claim 1 constitutes the backside surface or layer of the layered product.

10. A method according to claim 1, wherein the layered product is a flooring material.

11. A method according to claim 10, wherein said material is a parquet flooring.

12. A method of producing formaldehyde laden flooring materials, the materials having reduced emission of formaldehyde, of at least 2 layers at least one of the layers being a veneer constituting the backside surface or layer of the flooring material, comprising a step of treating at least one of the surfaces of said veneer, prior to bonding the layers together, with an aqueous solution comprising an ammonium salt, which content is in the range of from about 5% to about 30% by weight.

13. A method according to claim 12 wherein the ammonium salt is ammonium sulphite or bisulphite.

14. A method according to claim 12, wherein the ammonium salt is ammonium carbonate or ammonium hydrogen carbonate.

15. A method according to claim 12, wherein the solution further comprises urea.

16. A method according to claim 15, wherein the weight ratio of urea to ammonium salt is from about 3:10 to about 6:10.

17. A method according to claim 12, wherein said flooring material is a parquet flooring.

18. A formaldehyde laden layered product of at least 2 layers, the product having reduced emission of formaldehyde, at least one of the layers being a veneer, obtained by treating at least one of the surfaces of said veneer, prior to bonding the layers together, with a solution comprising an ammonium salt.

19. A formaldehyde laden layered product according to claim 18, wherein the veneer treated with the solution comprising the ammonium salt constitutes the backside surface or layer of the layered product.

20. A formaldehyde laden layered product according to claim 18, wherein the ammonium salt is ammonium sulphite or bisulphite.

21. A formaldehyde laden layered product according to claim 18, wherein the ammonium salt is ammonium carbonate or ammonium hydrogen carbonate.

22. A formaldehyde laden layered product according to claim 18, which is a flooring material.

23. A flooring material according to claim 22, which is a parquet flooring.

24. A flooring material, of at least 2 layers, the material having reduced emission of formaldehyde, at least one of the layers being a veneer constituting the backside surface or layer of the flooring material, obtained by treating at least one of the surfaces of said veneer, prior to bonding the layers together, with an aqueous solution comprising an ammonium salt, which content is in the range of from about 5% to about 30% by weight.

25. A flooring material according to claim 24, which is a parquet flooring.

* * * * *